US009450477B2

(12) United States Patent
Creviston et al.

(10) Patent No.: US 9,450,477 B2
(45) Date of Patent: Sep. 20, 2016

(54) B+ MOUNTED INTEGRATED ACTIVE RECTIFIER ELECTRONICS

(71) Applicant: Remy Technologies, LLC, Pendleton, IN (US)

(72) Inventors: Alex Creviston, Muncie, IN (US); Chris Bledsoe, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 146 days.

(21) Appl. No.: 14/160,990

(22) Filed: Jan. 22, 2014

(65) Prior Publication Data
US 2015/0207389 A1 Jul. 23, 2015

(51) Int. Cl.
| H02K 11/04 | (2016.01) |
| H02K 9/06 | (2006.01) |
| H02K 1/04 | (2006.01) |
| H02K 11/00 | (2016.01) |

(52) U.S. Cl.
CPC .................. H02K 11/048 (2013.01)

(58) Field of Classification Search
CPC ................ H02K 11/04; H02K 9/06
USPC .......... 310/43, 52, 64, 71, 68 D, 67 R, 68 R; 361/692
See application file for complete search history.

(56) References Cited

U.S. PATENT DOCUMENTS

| 4,952,829 A * | 8/1990 | Armbruster ........... H01L 25/115 257/E25.026 |
| 7,638,910 B2 * | 12/2009 | Akita ................... H02K 11/048 310/64 |
| 7,791,232 B2 * | 9/2010 | Purohit .................. B24B 23/03 310/50 |
| 7,855,482 B2 * | 12/2010 | Nakamura ........... H02K 11/046 310/68 D |
| 8,193,667 B2 | 6/2012 | Oohashi |
| 2003/0141042 A1 * | 7/2003 | Bradfield .............. H01L 25/115 165/80.3 |
| 2004/0183385 A1 * | 9/2004 | Takahashi ........... H01L 23/3672 310/68 D |
| 2006/0192446 A1 | 8/2006 | Ihata et al. |
| 2008/0018186 A1 | 1/2008 | Lybbert |
| 2012/0299449 A1 | 11/2012 | Ishikawa et al. |
| 2012/0306300 A1 | 12/2012 | Ishikawa et al. |
| 2015/0208528 A1 * | 7/2015 | Creviston ............ H05K 5/0213 361/692 |

OTHER PUBLICATIONS

International Search Report and Written Opinion; PCT/US2015/012422; May 13, 2015; 10 pages.

* cited by examiner

Primary Examiner — Terrance Kenerly
Assistant Examiner — Ahmed Elnakib
(74) Attorney, Agent, or Firm — Bose McKinney & Evans LLP

(57) ABSTRACT

A method of cooling electronics of an alternator includes mounting the electronics onto an electrically conductive electronics chassis, and electrically connecting the electronics chassis to a positive DC (B+) output voltage terminal of the alternator, whereby the electronics chassis is electrically insulated from ground potential and thermally conductively isolated from the alternator housing. An alternator includes the housing at ground potential, the electronics chassis at B+ potential, and the mounted electronics. The electronics chassis is electrically insulated and conductively isolated from the housing. An electric machine includes the electronics chassis having an electronics mounting surface, and a convection surface, and defines an electrical bus for conducting a B+ potential. An electronics chassis assembly has an insulator secured between the housing at ground potential and the electronics chassis.

20 Claims, 14 Drawing Sheets

B+ MOUNTED INTEGRATED ACTIVE RECTIFIER ELECTRONICS

BACKGROUND

The present invention is directed to improving efficiency and reliability of an electric generator and, more particularly, to reducing electrical resistance while directing thermal transfer in an integrated system including rectifier electronics.

Alternators convert mechanical energy into electrical energy for a vehicle. The rotor of an automotive alternator is typically driven by a belt and pulley system to rotate within stator windings coiled on a laminated iron core. The magnetic field from the spinning rotor induces an alternating voltage into the stator windings. The alternating voltage (AC) is typically then converted to a direct current (DC) voltage by a rectifying circuit that outputs the DC voltage to one or more batteries and to electrical devices of a vehicle.

A rectifying circuit may be formed using diodes, MOS-FET devices, or by other structure. The rectifying circuit and associated control components may be located in an alternator housing.

Modern automotive alternators are generally required to supply ever-greater amounts of electrical current. For example, hybrid and electric vehicles may use electricity instead of internal combustion for driving the wheels, and an alternator may be combined with a starter in a mild hybrid configuration such as in a belt alternator starter (BAS) system. Other electrical loadings from air conditioning, electric power steering, and various vehicle systems further increase the required alternator electrical generation capacity. As a result, efficiency of automotive alternators needs to be optimized. Efficiency is generally limited by fan cooling loss, bearing loss, iron loss, copper loss, and the voltage drop in the rectifier bridges. The use of permanent magnets may increase efficiency by providing field flux without relying on a wound field that inherently creates ohmic losses. An alternator may have dual internal fans to improve operating efficiency and durability and to reduce heat-related failures. Many conventional alternator systems are addressed to such concerns. However, additional improvements are desirable.

Available space within a motor vehicle engine compartment is limited as manufacturers strive to reduce the size of vehicles while maximizing power and efficiency. With multiple components packed in a relatively small space, the heat generated by a number of devices increases the temperature within the engine compartment. In addition, a tightly packed engine compartment may have limited space available for the flow of cooling air to reduce component temperatures. Excessive engine compartment temperatures may adversely affect device performance, including performance of the alternator.

Efficiency and reliability of an electrical generating device are affected by many factors, including the total resistance of output circuitry and the construction methodology. Reducing electrical resistance of a rectification circuit and controlling the flow of heat provides improvements in generator efficiency and reliability.

SUMMARY

It is therefore desirable to obviate the above-mentioned disadvantages by providing an electric machine such as an alternator, and a method of cooling such an electric machine.

According to an exemplary embodiment, a method of cooling electronics of an alternator having a housing electrically at ground potential includes mounting the electronics onto an electrically conductive electronics chassis, and electrically connecting the electronics chassis to a positive DC (B+) output voltage terminal of the alternator, whereby the electronics chassis is electrically insulated from ground potential and thermally conductively isolated from the housing.

According to another exemplary embodiment, an alternator includes a housing at ground potential, an electronics chassis electrically connected to a positive DC (B+) output voltage terminal of the alternator, and electronics mounted to the electronics chassis, wherein the electronics chassis is electrically insulated from the ground potential and thermally conductively isolated from the housing.

According to a further exemplary embodiment, an electric machine includes a stator including a core having a plurality of phase coils wound thereon; and an electronics chassis having an electronics mounting surface, having a convection surface, and defining an electrical bus for conducting a B+ potential. Electronics are structured for inputting AC voltages from the respective phase coils and for rectifying such AC voltages into a DC voltage defined between the B+ potential and a ground potential, the electronics being directly mounted to the electronics mounting surface. The electric machine also includes a housing coupled to the ground potential, and an insulator secured between the housing and the electronics chassis.

The foregoing summary does not limit the invention, which is defined by the attached claims. Similarly, neither the Title nor the Abstract is to be taken as limiting in any way the scope of the claimed invention.

BRIEF DESCRIPTION OF THE DRAWING FIGURES

The above-mentioned aspects of exemplary embodiments will become more apparent and will be better understood by reference to the following description of the embodiments taken in conjunction with the accompanying drawings, wherein.

Corresponding reference characters indicate corresponding or similar parts throughout the several views.

DETAILED DESCRIPTION

The embodiments described below are not intended to be exhaustive or to limit the invention to the precise forms disclosed. Mather, the embodiments are chosen and described so that others skilled in the art may appreciate and understand the principles and practices of these teachings.

Figure 1:
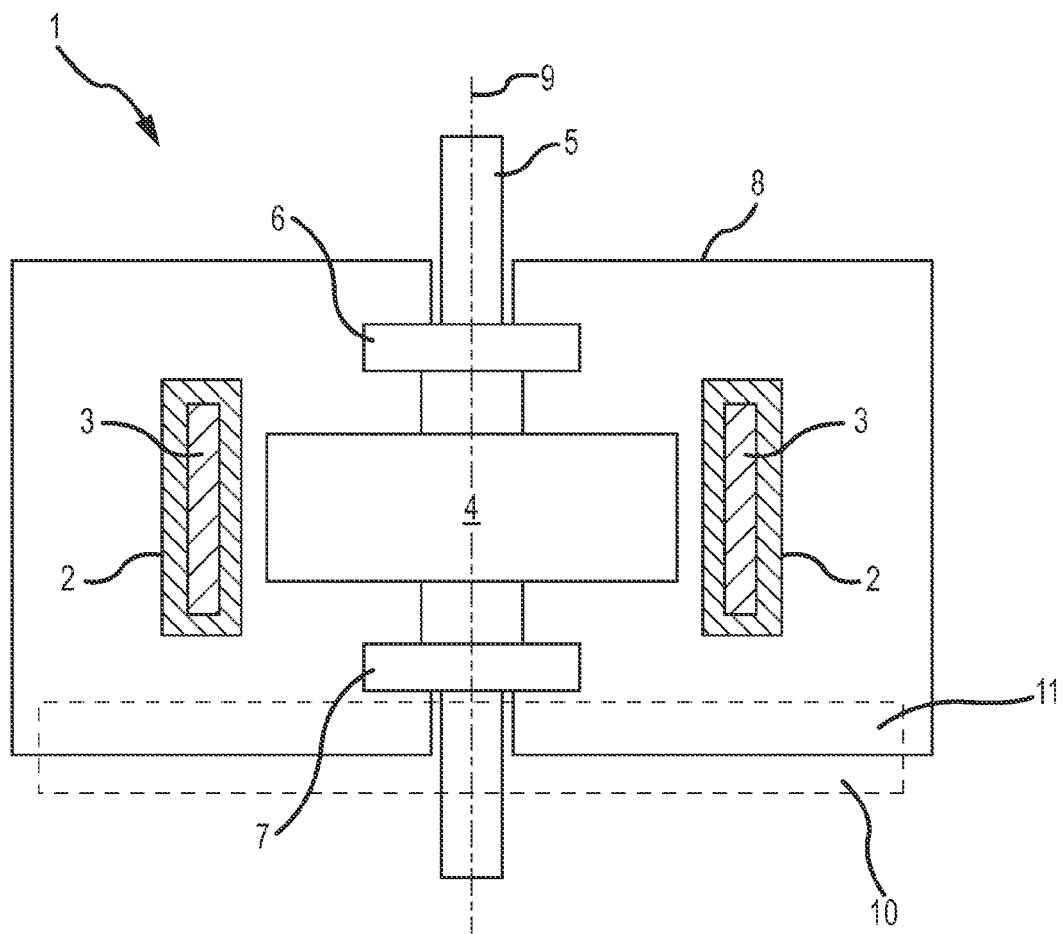
FIG. 1 is a schematic view of an exemplary electric machine.

FIG. 1 is a schematic view of an exemplary electric machine 1 having a stator 2 that includes stator windings 3 such as one or more coils. An annular rotor 4 may also contain windings and/or permanent magnets and/or conductor bars such as those formed by a die-casting process. Rotor 4 includes an output shaft 5 supported by a front bearing assembly 6 and a rear bearing assembly 7. Bearing assemblies 6, 7 are secured to a housing 8. Typically, stator 2 and rotor 4 are substantially cylindrical in shape and are concentric with a central longitudinal axis 9. Although rotor 4 is shown radially inward of stator 2, rotor 4 in various embodiments may alternatively be formed radially outward of stator 2. Electric machine 1 may be a motor/generator or other device. In an exemplary embodiment, electric machine 1 may be an alternator. Housing 8 may have a plurality of longitudinally extending fins (not shown) formed to be spaced apart from one another on a housing external surface for dissipating heat produced in the stator windings 3. An external electronics space 10 may be provided adjacent an axial end of housing 8 and/or an internal electronics space 11 may be provided within housing 8 for containing rectifying circuitry, control circuitry, and other associated components.

Figure 2:
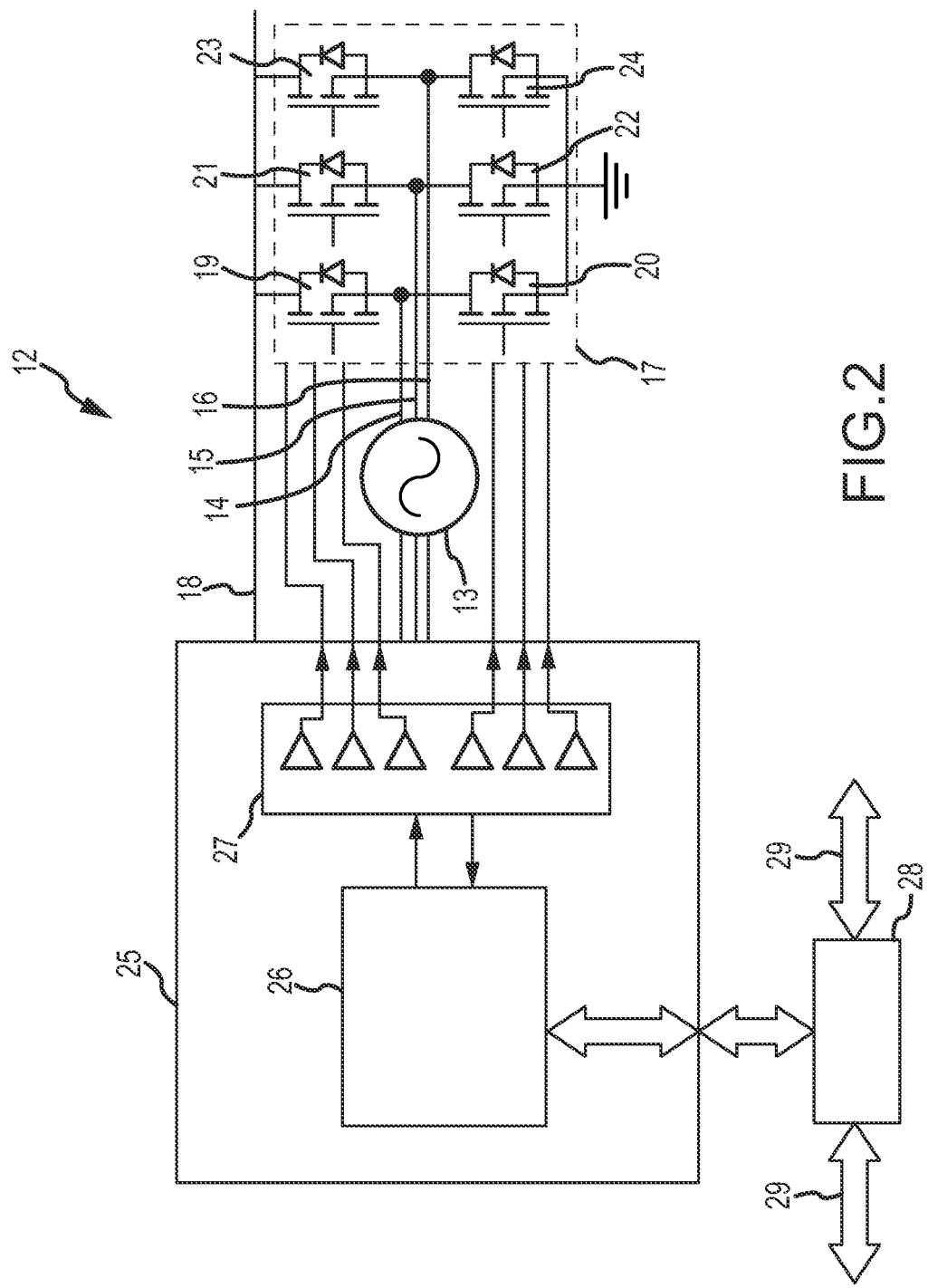
FIG. 2 is a simplified electrical schematic of an exemplary electronics circuit for a three-phase alternator.

FIG. 2 is a simplified electrical schematic of an exemplary electronics circuit 12 for a three-phase alternator 13. Alternator 13 outputs alternating current (AC) voltages at respective phase leads 14, 15, 16. Phase leads 14-16 are each connected to a separate half-bridge rectifier within a rectifier circuit 17 that converts the AC phase voltages into a DC voltage provided to a DC bus 18. In the illustrated embodiment, each half-bridge includes a high-side MOSFET and a low-side MOSFET, whereby phase lead 14 connects to the Source of high-side MOSFET circuit 19 and to the Drain of low-side MOSFET circuit 20, phase lead 15 connects to the Source of high-side MOSFET circuit 21 and to the Drain of low-side MOSFET circuit 22, and phase lead 16 connects to the Source of high-side MOSFET circuit 23 and to the Drain of low-side MOSFET circuit 24. In various embodiments, any of MOSFET circuits 19-24 may be an N-channel device or a P-channel device. MOSFET circuits 19-24 typically include a free-wheeling diode as shown. Although MOSFET circuits 19-24 are illustrated as being single devices, each may include any number of MOSFET devices. For example, each MOSFET circuit 19-24 may include several MOSFET devices connected in parallel, whereby all Gate terminals are connected, all Drain terminals are connected, and all Source terminals are connected together. In such a case, a higher current capacity may be obtained for each MOSFET circuit 19-24.

A control circuit 25 controls rectifier circuit 17 and other devices, and includes a control block 26 and MOSFET drivers 27. Control circuit 25 may receive various signals from sensors (not shown), phase signals from phase leads 14-16, and control signals, and may transmit control and information signals for implementing various functions, including functions for controlling alternator operation. Control circuit 25 may be configured to communicate with one or more remote device(s) such as a microcontroller 28 that, in turn, is in communication with other remote devices (not shown) via one or more analog or digital bus circuit(s) 29. Such communication may include transmitted/received control messages, architecture modifications such as software or firmware updates, error monitoring, voltage and current regulation information, electrical loading information, profile information and control such as for implementing dynamic control, and others. Since the operation of an alternator, by itself may be simplified in various embodiments, control circuit 25 may be formed using analog control. For example, timing sensing may be obtained directly from the phase voltages. When more complicated controls are required, such control circuitry may include digital devices. Any appropriate technology may be implemented for control circuitry, including discrete devices, processor(s), and/or combined circuitry such as application specific integrated circuit(s) (AMC).

The operation and configuration of electronics circuit 12 may be modified depending upon the particular alternator application. For example, control circuit 25 may be coupled to an external power supply, rectifier circuit 17 may include any number of MOSFETs, diodes, and other components. The term "MOSFET" has become somewhat generic. For example, the previously metal gate material is now often a layer of polysilicon (polycrystalline silicon). The term "enhancement mode" refers to the increase of conductivity with increase in oxide field that adds carriers to the channel, also referred to as the inversion layer. The channel can contain electrons (called an nMOSFET or nMOS), or holes (called a pMOSFET or pMOS), opposite in type to the substrate, so nMOS is made with a p-type substrate, and pMOS with an n-type substrate. In a depletion mode MOSFET, the channel consists of carriers in a surface impurity layer of opposite type to the substrate, and conductivity is decreased by application of a field that depletes carriers from this surface layer. As used herein, a MOSFET may also refer an insulated-gate field-effect transistor (IGFET).

Figure 3:
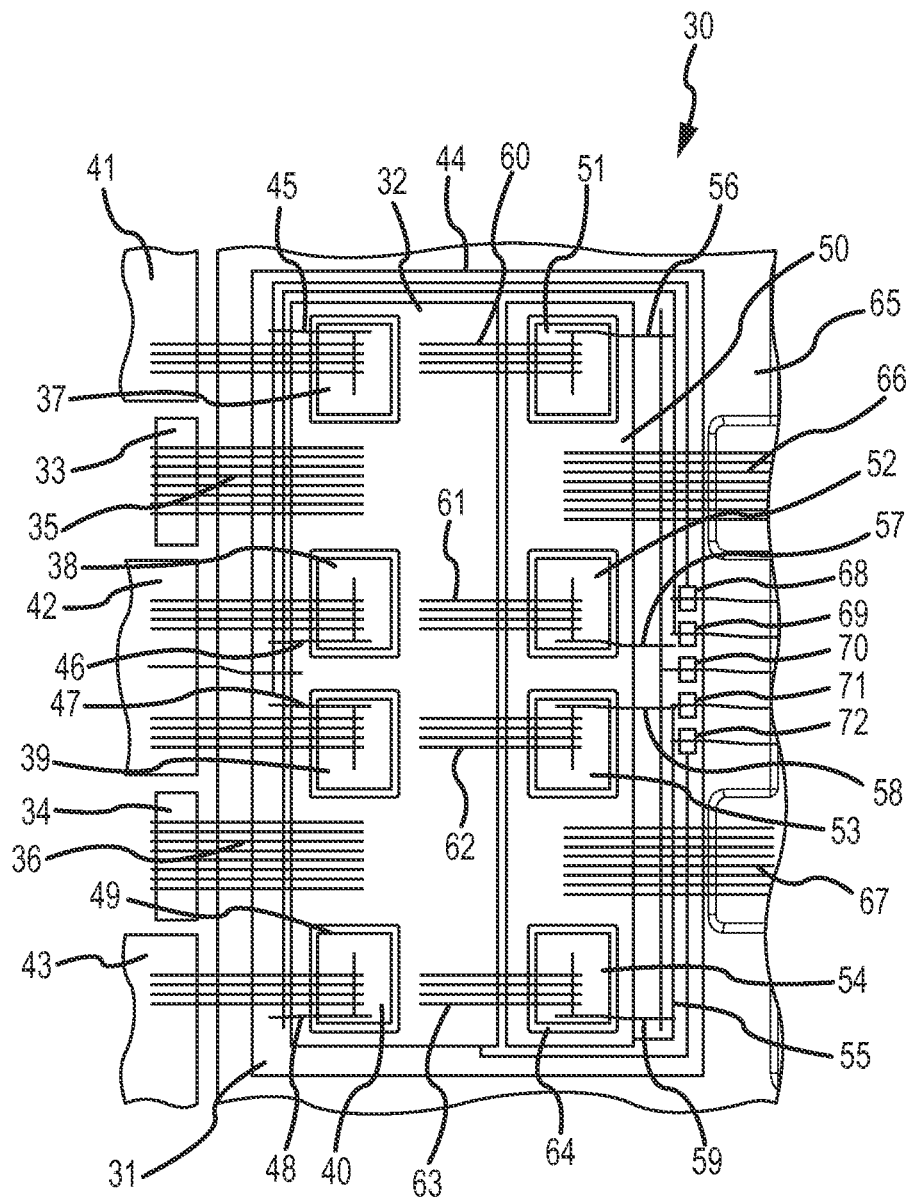
FIG. 3 is a top plan view of an exemplary MOSFET rectifier circuit for a single phase.

FIG. 3 is a top plan view of an exemplary power electronics board 30 for the MOSFET rectifier of a single phase. Power electronics board 30 may be formed on a ceramic substrate 31 using a combination of technologies such as thick-film, wire bonding, semiconductor processes, and others. For example, MOSFET devices may be separately formed as semiconductor chips using a thin-film technology. Power electronics board 30 includes a low side formed as a generally rectangular thick-film, low side island 32 using a conductive material such as silver, gold, or other. Low side island 32 is electrically connected to the single phase at pads 33, 34 via respective bonded wire sets 35, 36. The number of individual bonded wires used in a given connection corresponds to the current carrying capacity thereof. For example, when bonded wire sets 35, 36 each contain eight wires, a typical current capacity may thereby be provided for a peak current of approximately 375 amperes. Individual bond wires in a typical embodiment may be 0.015 to 0.020 inch aluminum, but any other gauge and type of material may alternatively be used.

Low side island 32 encloses MOSFETs 37-40 that are electrically connected in parallel with one another, whereby the four MOSFETs 37-40 may substantially act as a single device (e.g., MOSFET circuit 20 of FIG. 2) having an increased current capacity. When MOSFETs 37-40 are N-channel devices, the tops of such devices include respective Source terminals that are wire bonded as shown to ones of pads 41-43 electrically at ground potential. The individual Gate terminals of MOSFETs 37-40 are respectively electrically connected to a low side gate drive conductor 44 with bonded wires 45-48. The respective Drain terminals of MOSFETs 37-40 are electrically connected to the phase voltage of low side island 32 by conductors within respective thick-film regions 49 surrounding each MOSFET 37-40, or by other connection(s).

A high side island 50 encloses MOSFETs 51-54 electrically connected in parallel with one another, whereby the four MOSFETs 51-54 may substantially act as a single device (e.g., MOSFET circuit 19 of FIG. 2) having an increased current capacity. When MOSFETs 51-54 are N-channel devices, the tops of such devices include respective Source terminals that are wire bonded via bonded wire sets 60-63 to low side island 32 electrically at phase potential. The individual Gate terminals of MOSFETs 51-54 are respectively electrically connected to a high side gate drive conductor 55 with bonded wires 56-59. The respective Drain terminals of MOSFETs 51-54 may be electrically connected to the DC bus voltage (e.g., B+) potential of high side island 50 by conductors within respective thick-film regions 64 surrounding each MOSFET 51-54, or by other connection(s). High side island 30 is electrically connected to a DC bus voltage (e.g., B+ potential) chassis structure 65 by bonded wire sets 66, 67, where chassis structure 65 may be formed to completely surround power electronics board 30. Power electronics board 30 has a DC voltage terminal 68, a phase terminal 69, a ground terminal 70, a low side gate drive terminal 71, and a high side gate drive terminal 72, and such terminals provide convenient locations to provide corresponding input/output, such as by jumpering.

Figure 4:
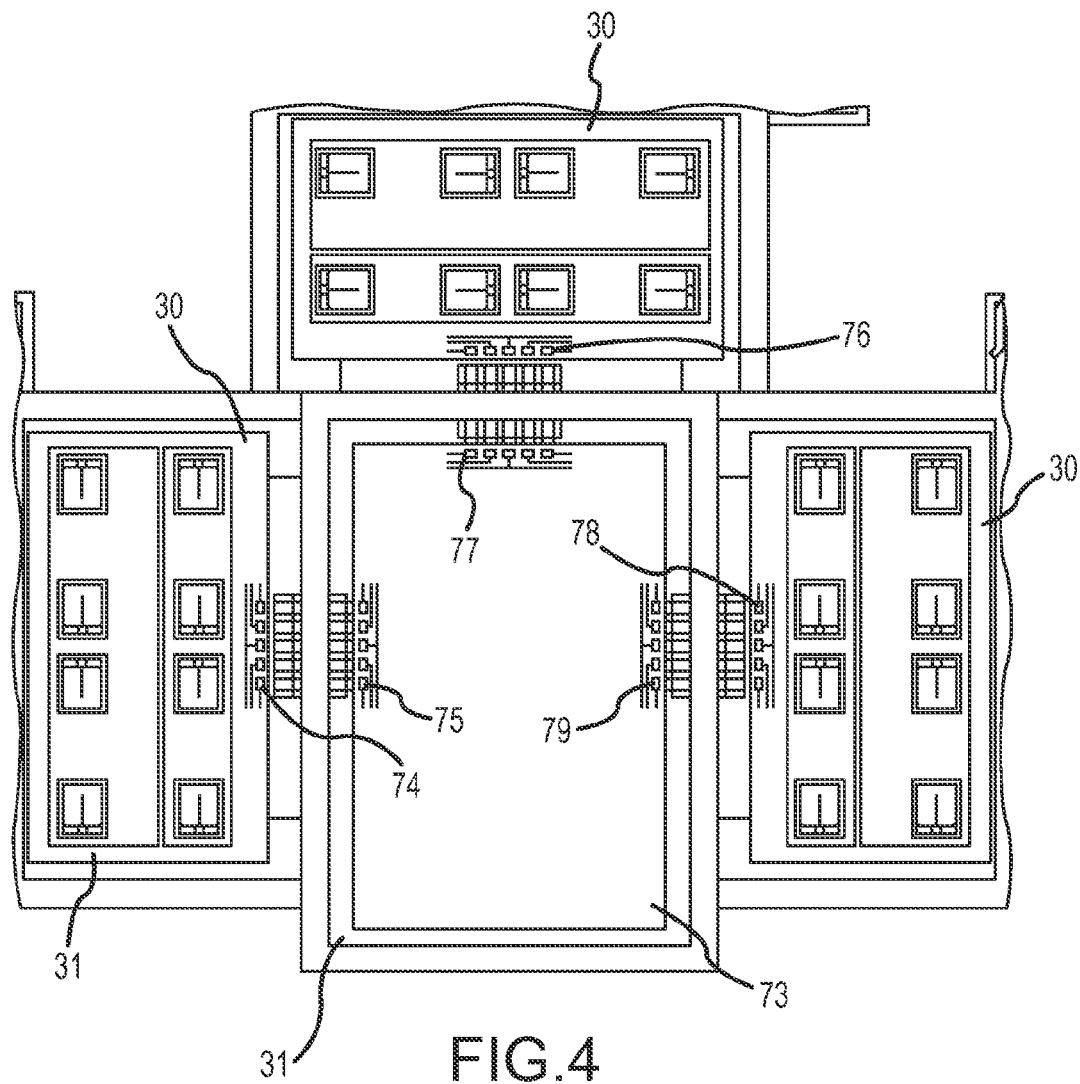
FIG. 4 is a top plan view of an exemplary general layout for rectification and control electronics of a three phase alternator.

FIG. 4 is a top plan view of an exemplary general layout for rectification and control electronics of a three phase alternator. Each phase has a separate rectifier circuit including a power electronics board 30. A control circuit including control board 73 is electrically connected to each of the three power electronics boards 30 and controls all functions thereof. For convenience, terminals 68-72 (FIG. 3) of each power electronics board 30 are now referred to collectively, for each phase. For example, a power electronics board 30 for phase A has terminals 74 that are jumpered by bonded wires to corresponding phase A terminals 75 of control board 73, a power electronics board 30 for phase B has terminals 76 that are jumpered by bonded wires to corresponding phase B terminals 77 of control board 73, and a power electronics board 30 for phase C has terminals 78 that are jumpered by bonded wires to corresponding phase C terminals 79 of control board 73. Control board 73 may have a basic configuration such as that shown by example as control circuit 25 in FIG. 2, or it may have an alternative form. MOSFETs are typically not mounted directly to the ceramic substrates but are, instead, secured thereto with individual copper-invar-copper heat spreaders (not shown) having heights approximately 0.008 inch.

Figure 5:
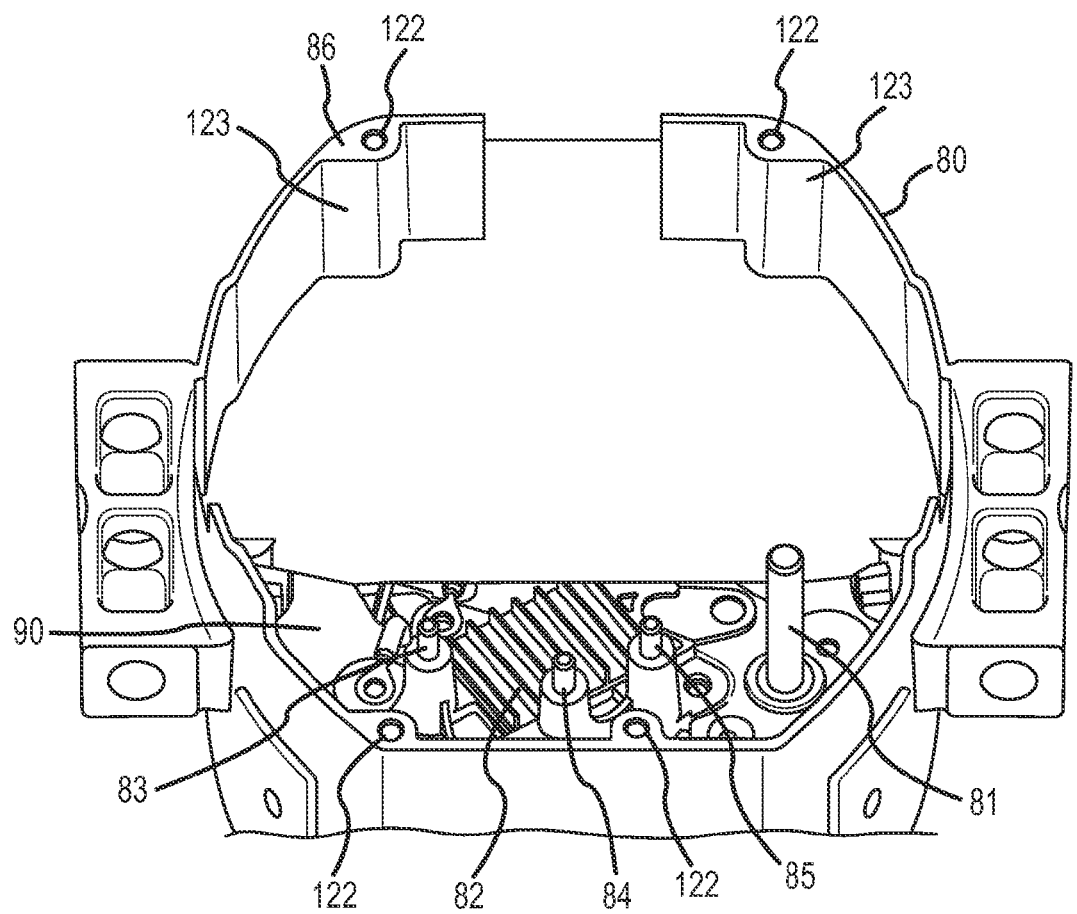
FIG. 5 is a partial perspective view of one axial end of an exemplary alternator housing.

FIG. 5 is a partial perspective view of one axial end of an exemplary housing 80, typically formed of metal such as aluminum, steel, or other. Housing 80 is commonly at ground potential in many automotive applications. A post defining B+ output terminal 81 projects axially from an interior mounting location and is structured for electrical connection to a heavy gauge battery type cable (not shown) for outputting DC voltage for charging one or more batteries (not shown) and for powering various electrical loads. For example, B+ output terminal 81 may be a threaded bolt. A voltage regulator 82, phase lead terminals 83, 84, 85, and other components are formed or attached within housing 80 at the axial end 90 thereof. Such components may be located su that a cover and/or other structure, such as embodiments of an electronics chassis (described below), may be attached to a housing axial end surface 86 without contacting the axial end electrical components. For example, axially extending threaded receptacles 122 are provided at designed locations around the circumference of housing axial end surface 86 and associated surrounding portions 123 of housing 80 are structurally adapted to accommodate such receptacles.

Figure 6:
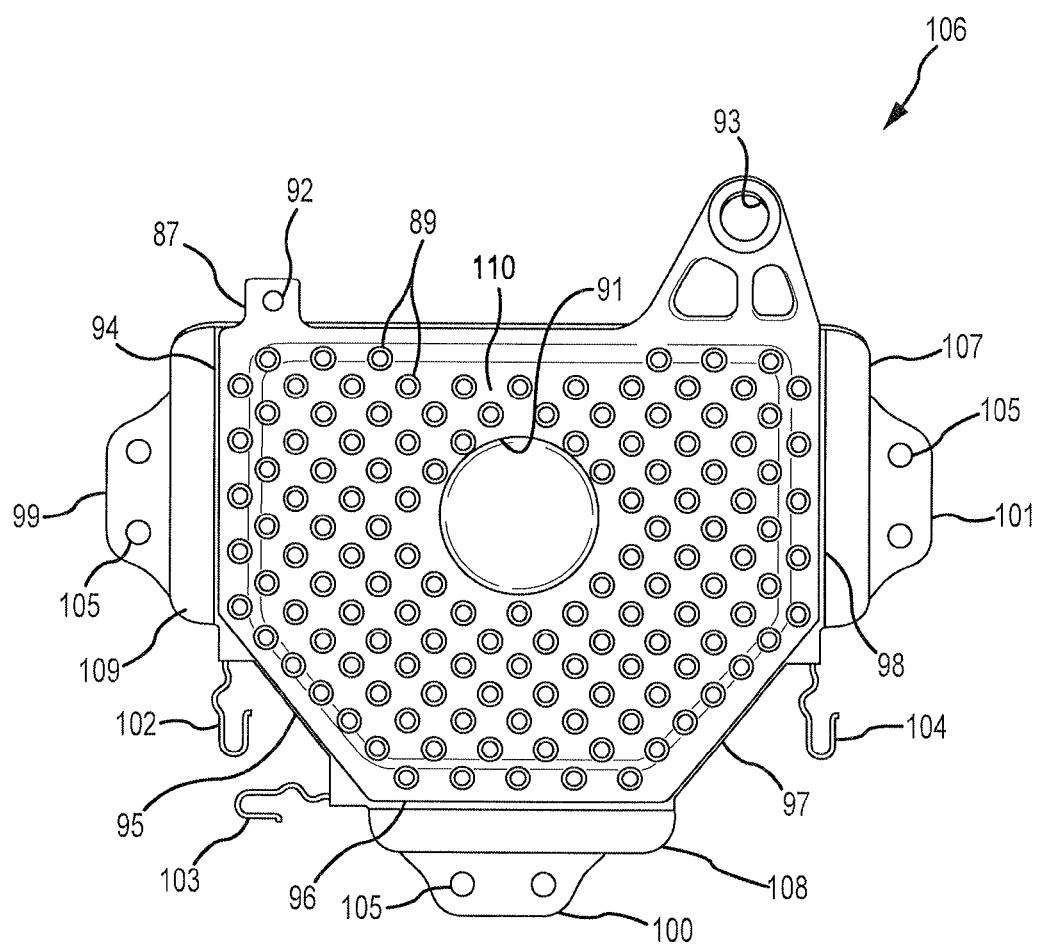
FIG. 6 is a bottom plan view of the convective heat exchange side of an electronics chassis assembly that includes an electronics chassis, according to an exemplary embodiment.
Figure 8:
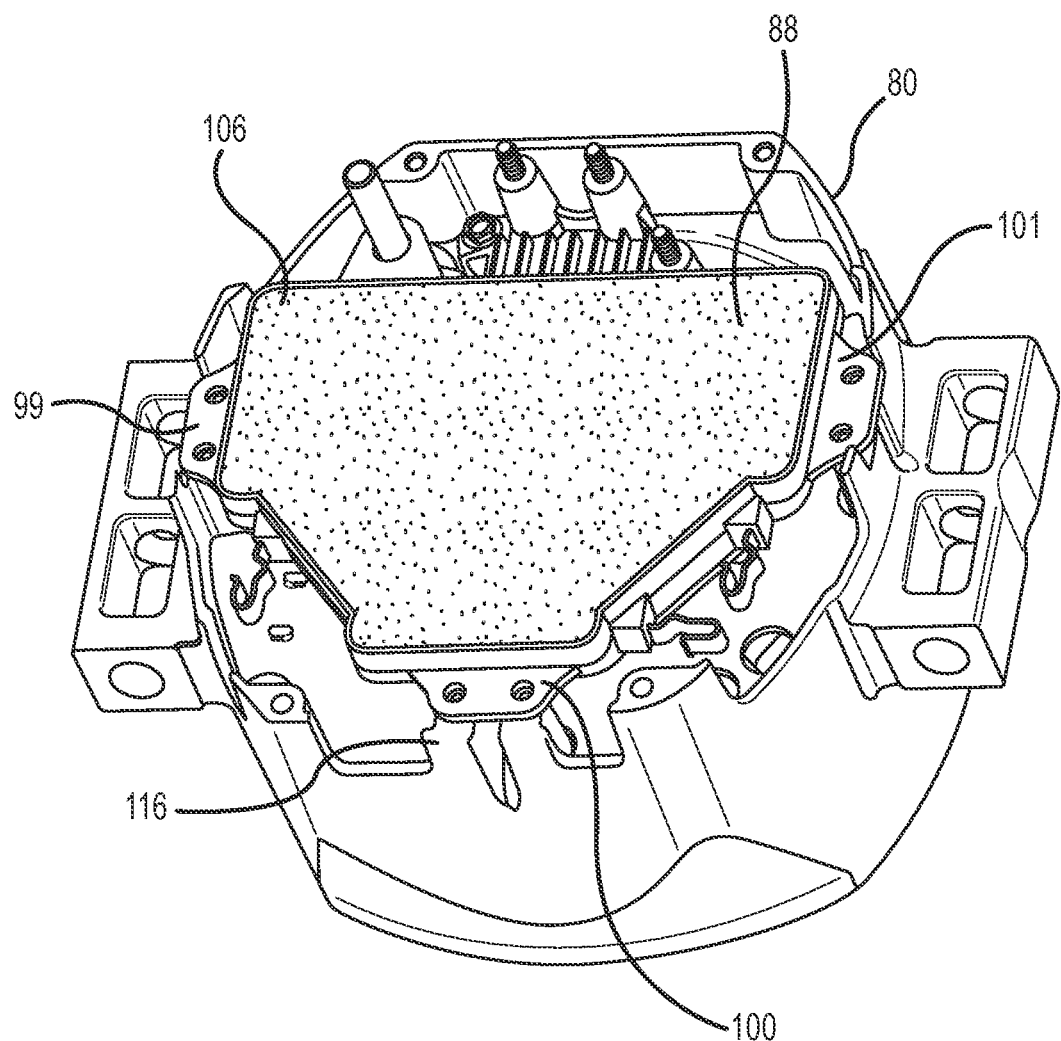
FIG. 8 is a perspective view of the electronics chassis assembly of FIG. 6 being placed into position for securement to the alternator housing of FIG. 5, according to an exemplary embodiment.
Figure 11:
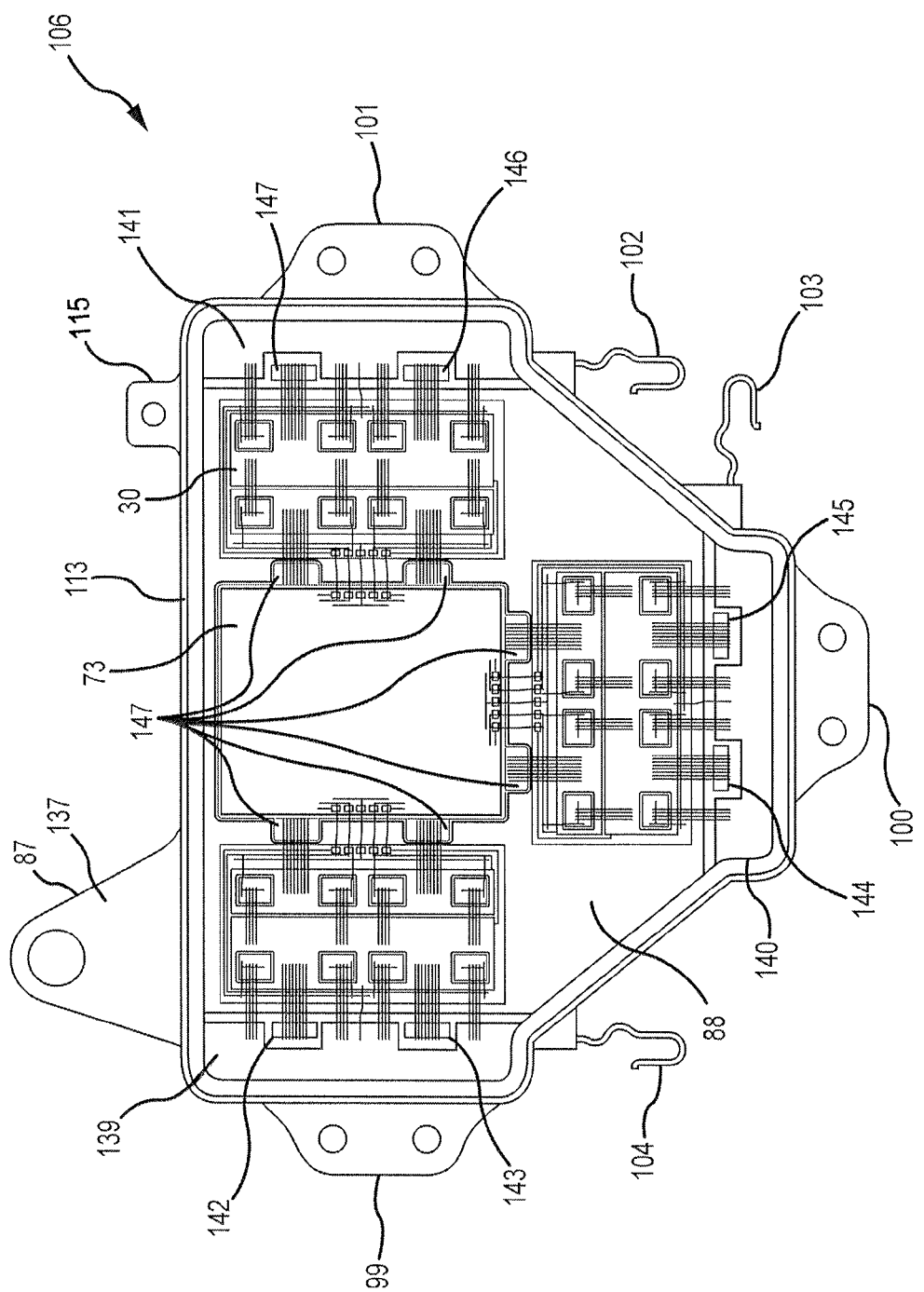
FIG. 11 is a top plan view of an electronics chassis assembly showing ground, phase, and B+ potentials being fed to power electronics boards and to a central control circuit, according to an exemplary embodiment.

FIG. 6 is a bottom plan view of the heat exchange side of an electronics chassis assembly 106 that includes electronics chassis 87, according to an exemplary embodiment. Electronics chassis 87 may be formed of aluminum or another electrically conductive material. Aluminum is typically used because of its light weight and adaptability to connection structure such as brazed or wire-bonded electrical joints. Electronics chassis 87, as described further below, is connected to the DC voltage (B+) potential. An array of heat sink projections in the form of heat sink pins 89 are integrally formed to extend axially inward from convection surface 110 on the axially-inward, convective heat exchange side of aluminum electronics chassis 87. A center feature 91, such as a recess, an indentation or a projection, may be provided to allow clearance for an adjacent structure such as a hub or shaft assembly when electronics chassis assembly 106 is mounted to housing 80. Axially opposite its convection surface 110, electronics chassis 87 has electronics mounting surface 88 (FIGS. 8, 11). Electronics chassis 87 may include one or more B+ connection hole(s) 92 that may be formed in B+ terminal portion(s) 115 for electrically connecting and structurally accommodating associated terminals (not shown), fasteners, wires, and the like. The B+ output terminal receiving portion 114 and the B+ terminal portion 115 may be formed at any appropriate locations along the perimeter of electronics chassis 87. A bore 93 in a B+ output terminal receiving portion 114 of electronics chassis 87 has a diameter slightly less than the diameter of the post defining B+ terminal 81 (FIG. 5), whereby the B+ output terminal 81 may be interference fit into bore 93 during assembly and thereby effect a B+ electrical connection. Such B+ connection may also include a brazed or welded joint. Chassis surfaces 88, 110 may have consecutive outer edges 94-98 that are contiguous with one or more electrically insulating portion(s) that secure wound and phase potentials in close proximity to outer edges 94-98. Aluminum ground tabs 99-101, copper phase connectors 102-104, and electronics chassis 87 are all joined together with an electrically insulating material such as plastic, whereby ground and multiple phase potentials are placed in proximity to the B+ potential of electronics chassis 87. Ground tabs 99-101 each have mounting holes 105 for mounting electronics chassis assembly 106 to housing 80 (FIG. 5) at corresponding threaded receptacles (not shown) formed therein. Copper phase connectors 102-104 may be copper leads that are brazed or welded to aluminum terminal posts having connection pads (described further below) and these copper to aluminum joints are each typically enclosed within respective plastic over mold portions 107-109.

Figure 7:
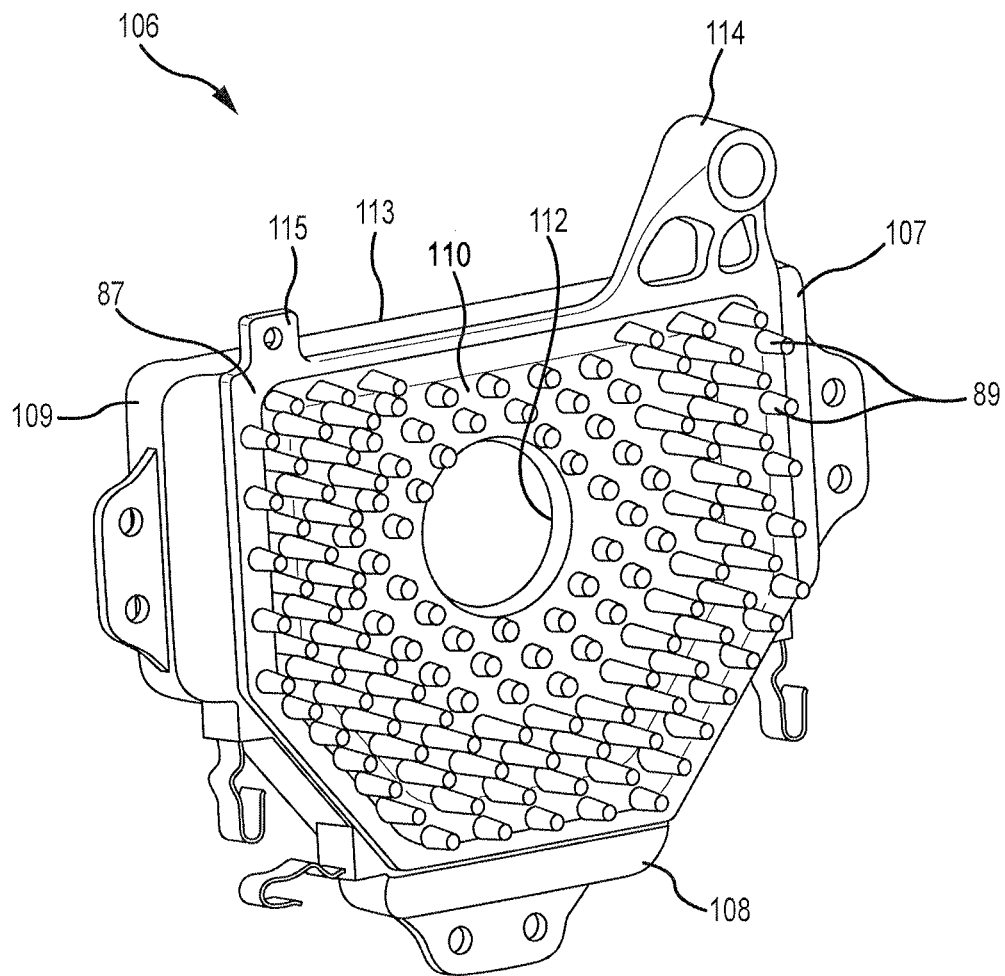
FIG. 7 is a perspective view of the convective heat exchange side of the electronics chassis assembly of FIG. 6.

FIG. 7 is a perspective view of the convective heat exchange side of electronics chassis assembly 106, according to an exemplary embodiment. As noted above, an array of heat sink pins 89 are integrally formed to axially extend from convection surface 110 of aluminum electronics chassis 87, and as seen in FIG. 7 sink pins 89 have various heights that depend on the proximity of adjacent structure within housing 80. Since heat sink pins 89 and other portions of electronics chassis 87 are at B+ potential, the heights of heat sink pins 89 are chosen to avoid shorting or otherwise contacting heat sink pins 89 with other components or ground. An insulator 113 is defined by a plastic over-mold which includes over-molded portions 107-109.

FIG. 8 is a perspective view of electronics chassis assembly 106 placed into position for securement to housing 80, according to an exemplary embodiment. Fasteners (not shown) such as screws or the like may secure ground tabs 99-101 to threaded receptacles formed in respective chassis support portions 116 of housing 80. Electronics mounting surface 88, located beneath shown cover plate 155, may be formed to include any number of machined portions for attachment of B+ bonding wires thereto, may be configured in any appropriate shape for fitment onto the axial end of housing 80, may be structured for containing any number of electronics devices such as ceramic substrates, and may contain any number of plastic over mold portion(s) for electrically insulating phases, ground, B+ and any other electric potential(s) from one another, and for providing structural support/integrity.

Figure 9:
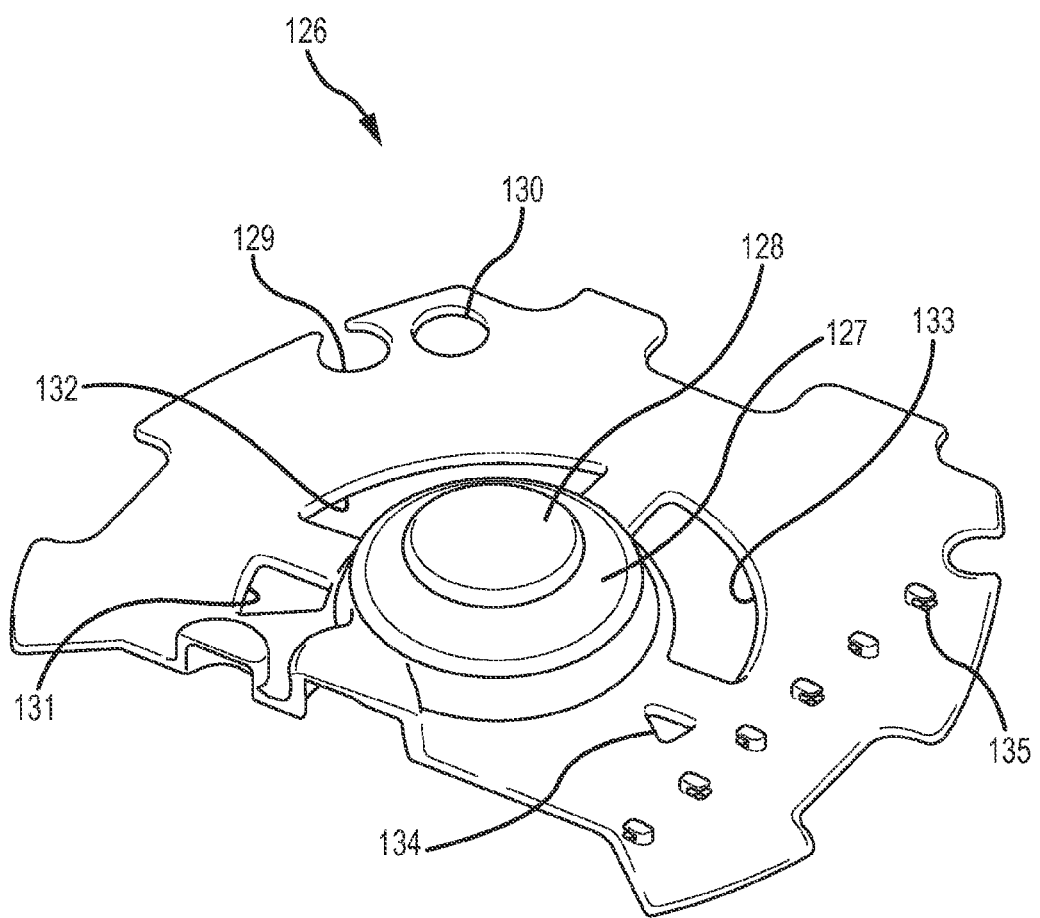
FIG. 9 is a perspective view of a ventilating insulator, according to an exemplary embodiment.

FIG. 9 is a perspective view of a ventilating insulator 126, according to an exemplary embodiment. Ventilating insulator 126 is typically formed of thin plastic, and may be placed on the axially inward side of electronics chassis 87 (FIGS. 6 and 7), or electronics chassis 125 (FIG. 10) discussed further below, between the electronics chassis and the surrounding portions at axial end 90 of housing 80. For example, ventilating insulator 126 may have respective first and second raised portions 127, 128 formed in a center thereof, for spatially accommodating an underlying hub and/or shaft assembly of an alternator. Ventilating insulator 126 may include openings 129, 130 structured for accessing and/or spatially accommodating additional components such as phase terminal posts. Ventilation holes 131-134 are provided to direct cooling air to pass therethrough and to flow in a particular pattern to assist convective cooling of heat sink pins 89 (FIGS. 6 and 7). Additional features such as clips 135 and others, may be formed in ventilating insulator 126.

Figure 10:
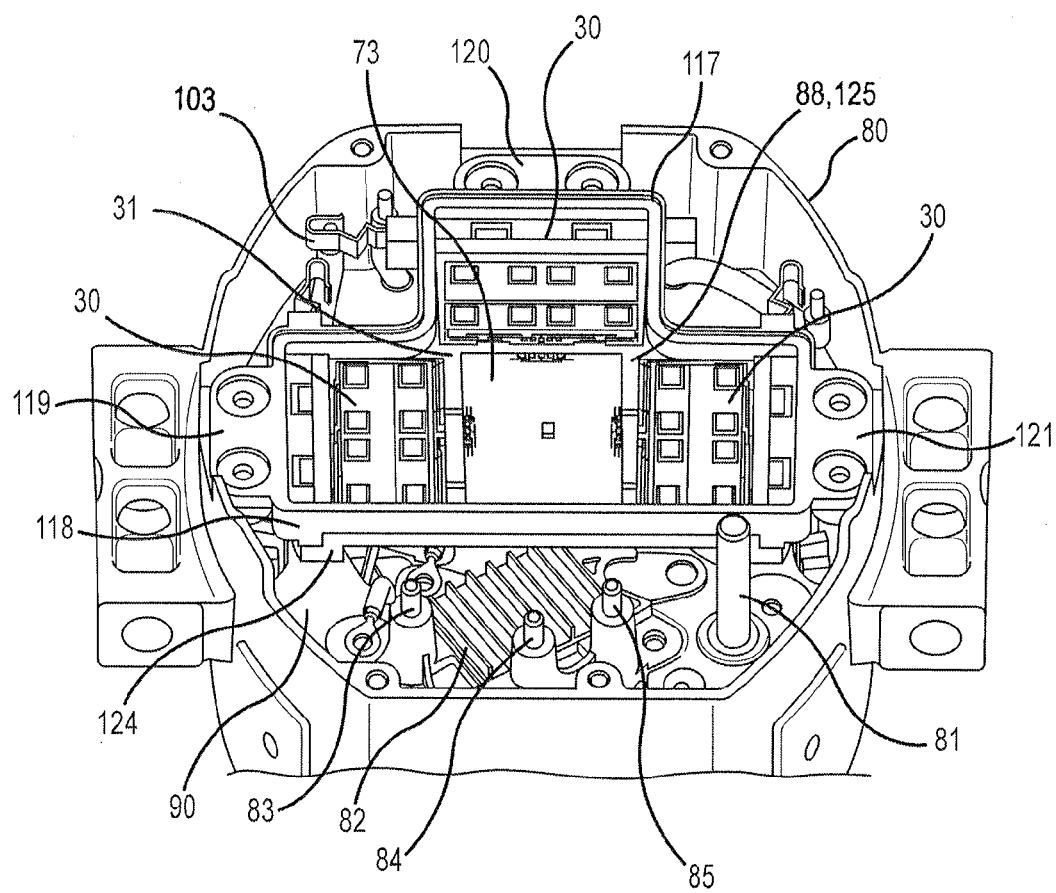
FIG. 10 is a partial perspective view of an electronics chassis assembly placed into position for securement to the alternator housing of FIG. 5, according to an exemplary embodiment.

FIG. 10 is a partial perspective view of an electronics chassis assembly 117 according to an alternative exemplary embodiment that includes electronics chassis 125 and is placed into position for securement to housing 80. The shape of electronics chassis assembly 117 substantially conforms to the combined, placed shape of three rectifier power electronics boards 30 and a ceramic control board 73 (FIG. 4). By such configuration, the amount of exposed aluminum of axially-outward-facing electronics mounting surface 88, having B+ potential, may be minimized. In addition, the extra space may be provided for components such as B+ output terminal 81, phase terminals 83-85, voltage regulator 82, and others, and may reduce or eliminate the need for further electrical insulation between electronics chassis assembly 117 and surfaces of housing axial end 90. For example, a plastic over-molded insulator member 118 may be formed with an axially-extending wall that acts as a protective barrier for power electronics board substrate 31 and the electronics components mounted thereon, whereby such electronics and power electronics board substrate 31 are axially recessed. Ground tabs 119-121 may be integrally formed with a perimeter ground member 124. In such a case, plastic over-molded insulator member 118 separates perimeter ground member 124 from the aluminum electronics chassis 125, whereby substantially the only exposed B+ potential of electronics chassis 125 is that which is formed as heat sink pins (e.g., FIG. 7) facing axially inward. The additional space provided by this configuration may allow more cooling air flow.

FIG. 11 is a top plan view of electronics chassis assembly 106 showing ground, phase, and B+ potentials being fed to power electronics boards 30 and control board 73, according to an exemplary embodiment. Electronics chassis 87 is at B+ potential. Surface 88, B+ terminal post receiving portion 114 and B+ terminal portion 115 are integral portions of chassis 87 and are, therefore, also at B+ potential. Ground tabs 99-101 are integral with exposed ground surfaces 139-141, respectively, and are all at ground potential. Phase connection pads 142, 143 are aluminum and are joined by brazing to copper phase connector 104. Phase connection pads 144, 145 are aluminum and are joined by brazing to copper phase connector 103. Phase connection pads 146, 147 are aluminum and are joined by brazing to copper phase connector 102. Such brazed connections are typically enclosed within plastic over-molded insulator 113. Ground surfaces 139-141, phase connection pads 142-147, and electronics mounting surface 88 of electronics chassis 87 are all substantially coplanar so that bonding wires from various portions of power electronics boards 30 and from control board 73 may be easily attached thereto. In addition, any associated attachment locations may be machined or otherwise prepared to provide reliable wire bonding surfaces. For example, electronics mounting surface 88 includes machined B+ wire bonding pads 158.

Figure 12:
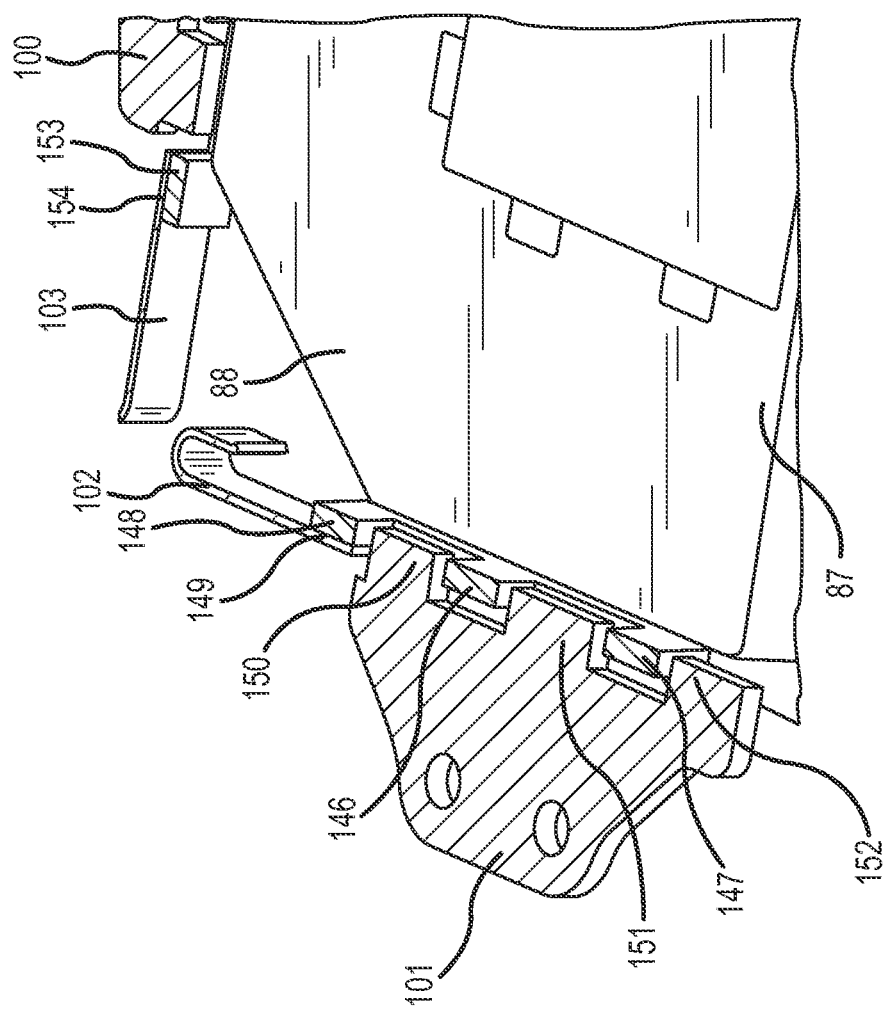
FIG. 12 is a partial perspective view showing a welded bimetal phase lead structure before such structure is partially covered in a plastic over-mold, according to an exemplary embodiment.

FIG. 12 is a partial perspective view showing a welded bimetal phase lead before such structure is partially covered in a plastic over-mold, according to an exemplary embodiment. The phase lead has a copper phase connector 102 (FIG. 11) and an aluminum phase lead manifold 148 joined together at a welded/brazed joint 149. Phase lead manifold 148 is integrally formed to include phase connection pads 146, 147 that may have polished or machined surfaces suitable for wire bonding to an adjacent power electronics board 30 (FIG. 11) located on electronics mounting surface 88 of chassis 87. Phase connection pads 146, 147 are interposed, such as by being interdigitated, between and spaced from ground pads 150-152 of ground tab 101. The tops of phase connection pads 146, 147 and ground pads 150-152 may be substantially coplanar with electronics chassis surface 88. In like manner, shown copper phase connector 103 and an aluminum phase lead manifold 153 are joined together at a welded/brazed joint 154.

Figure 13:
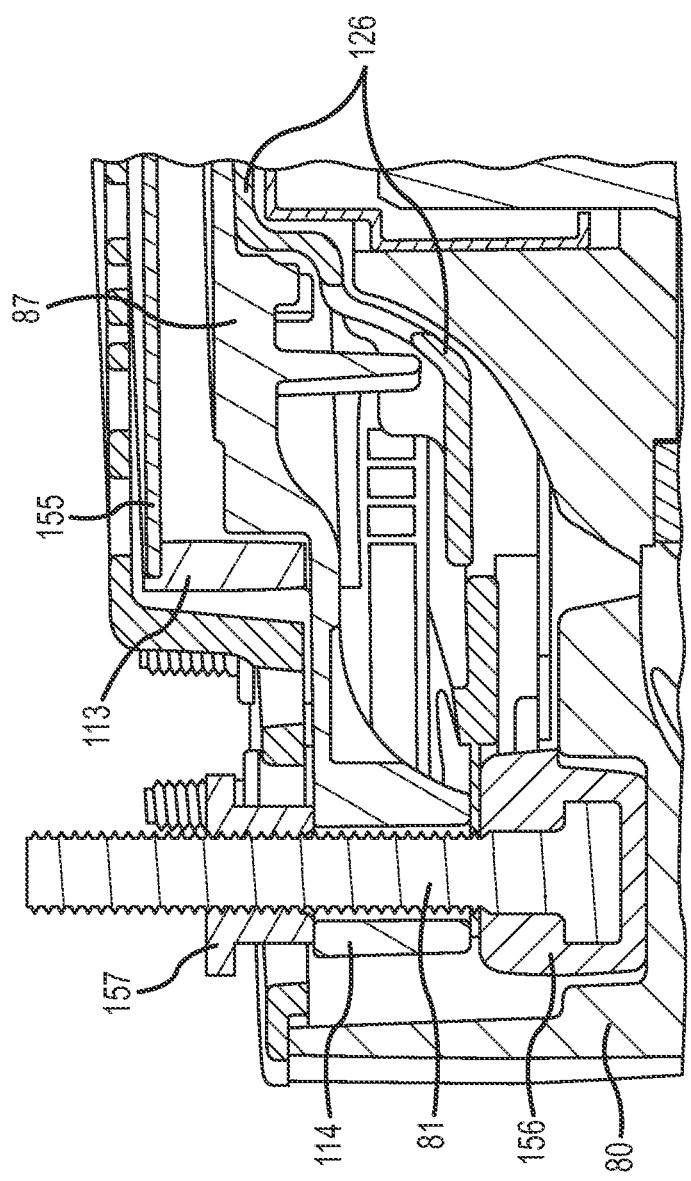
FIG. 13 is a partial perspective view showing a cross-section through a B+ output terminal and a B+ output terminal receiving portion of an electronics chassis, according to an exemplary embodiment.

FIG. 13 is a partial view showing a cross-section through B+ output terminal 81 (FIG. 5) and B+ output terminal receiving portion 114 (FIG. 7) of electronics chassis 87, according to an exemplary embodiment. Ventilating insulator 126 (FIG. 9) is interposed between electronics chassis 87 and surrounding metal structure to prevent electronics chassis 87, which is at B+ voltage, from shorting thereto. One or more cover plate(s) 155 may be secured to an axial end of electric machine 1. Plastic over-molded insulator 113 may be formed to electrically insulate and to provide structural support for various components, as described above. B+ output terminal 81 may be set into and electrically insulated from housing 80 with a molded plastic insert 156, and the axially outward portion of the post defining B+ output terminal 81 may be secured to B+ output terminal receiving portion 114 with a threaded locking nut 157, thereby holding B+ output terminal 81 securely in place.

Figure 14:
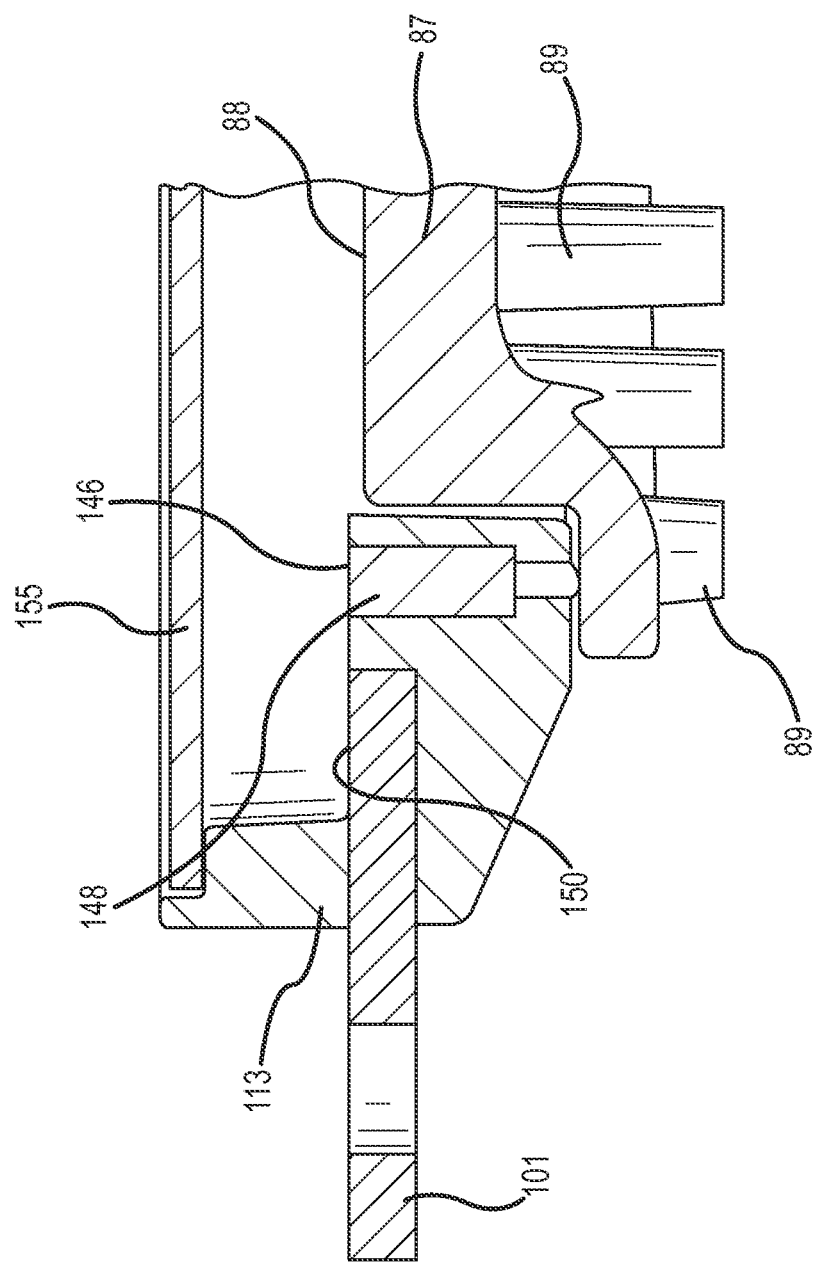
FIG. 14 is a partial view showing a cross-section through a ground tab and an aluminum phase bar, according to an exemplary embodiment.

FIG. 14 is a partial view showing a cross-section through a ground tab 101 (FIG. 11) and an aluminum phase bar formed by phase lead manifold 148 (FIG. 12), according to an exemplary embodiment. Wire bonding phase connection pad 146 and ground pad 150 are substantially coplanar with electronics mounting surface 88 of electronics chassis 87. Heat sink pins 89 of electronics chassis 87 may have differing lengths, depending on proximity of adjacent structure and on desired cooling air flow through heat sink pins 89. Plastic over-molded insulator 113 prevents electrical conduction between electronics chassis 87, phase lead manifold 148 and ground tab 101.

As a result of utilizing an electronics chassis at B+ potential that is electrically and structurally isolated from the grounded housing of an electric machine, the electronics directly mounted on the electronics chassis are thermally decoupled from the housing. For example, since the electronics chassis may be installed into the electric machine with little or no thermal conduction between the electronics chassis and the housing, the excessive heat often generated by stator windings is not conducted into the electronics mounted on the electronics chassis; instead, a cooling air flow may enter the electric machine and be directed by the ventilating insulator and other structure to first cool the electronics and then proceed to cool the stator assembly with the convection air flow. An aluminum electronics chassis may be easily formed with an electrical current capacity well in excess of a designed peak current capacity, typically measured at the B+ output terminal. An upper limit for current through the electronics may depend on physical limitations on the number and size of respective parallel feed-wire bonds from B+ and from ground. Multiple thick-film pads and associated conductors may also be used for increasing current capacity. Suitable aluminum may be, for example, a type 50, 52, H32, 60, 61, or other.

Each of the phase connections to the electronics may be segmented into two or more wire bonding pads, and a given phase connection may be routed around ground conductor(s) within the plastic over-mold. By having a brazed joint within the plastic over-mold, a phase connection provides a copper end adapted for a solder joint and provides one or more aluminum pads adapted for wire bonding. Typically, all plastic is formed in a single manufacturing step. A suitable plastic, for example, may be polybutylene terephthalate (PBT), polyphenylene sulfide (PPS), or other, but nylon or any other relatively strong, electrically insulating material may be used in place of plastic over-mold material. PPS may have better flow characteristics for forming plastic in locations having tight clearance space. Glass and/or fiber filler material may be included in the chosen plastic.

A reduced space and parts count, more efficient cooling, and an improved assembly for alternator electronics are provided by the disclosed embodiments. For example, ground tabs of an electronics chassis assembly may be kept very short and, therefore, such ground tabs may also be relatively thin because the associated electrical resistance is low and the tabs do not need to carry electrical current for a long distance. By maintaining the electronics on coplanar substrates directly mounted to the electronics chassis and by maintaining B+, phase, and ground connections to the electronics on the same single plane, all intra-connections' lengths may be minimized and such connections may be formed simply by vibration type wire bonding. Short wire bonds have reduced electrical resistance compared with traditional designs, and the disclosed embodiments also reduce the number of joints and interconnections compared with traditional electric machines, further reducing electrical resistance. The electronics chassis eliminates otherwise lengthy B+ conductor paths and simplifies construction. For example, B+ of the electronics chassis is directly connected to the customer B+ terminal post without any additional conductor besides the traditional B+ post fastening nut (not shown).

The unitary heat sink pins of the electronics chassis improve temperature related performance characteristics of an electric machine. Such heat sink pins are thermally isolated from the heat of the adjacent housing as a result of being structurally separated from the housing and other conductive surfaces and as a result of the ventilating insulator placed between the electronics chassis heat sink pins and the axial end of the housing. By incorporating the heat sink pins into the electronics chassis, surface area of the electronics chassis being used for convective heat transfer, and corresponding usage/accounting of the aluminum material, is substantially increased. For example, the convection air flow may be provided by one or more fans (not shown) located within the housing and/or externally of the housing, depending on the particular alternator configuration. By the disclosed embodiments, the conductive heat transfer path between the electronics mounted on the electronics chassis and the housing is eliminated.

While various embodiments incorporating the present invention have been described in detail, further modifications and adaptations of the invention may occur to those skilled in the art. However, it is to be expressly understood that such modifications and adaptations are within the spirit and scope of the present invention.

What is claimed is:

1. A method of cooling rectification electronics of an alternator having a positive DC output voltage (B+) terminal, a center axis, and an electrically grounded housing, comprising:
   electrically connecting a unitary chassis to the positive DC output voltage (B+) terminal;
   mounting the rectification electronics onto a surface of the chassis;
   providing a ground terminal, a plurality of AC phase voltage terminals, the rectification electronics, and the chassis surface on a plane substantially orthogonal to the center axis;
   interposing, along the plane, at least one of the plurality of AC phase voltage terminals and a plurality of electrically grounded wire bonding pads; and
   forming intra-connections along the plane by wire bonding, from each of the ground terminal, the chassis, and the plurality of AC phase voltage terminals, to the electronics;
   whereby the chassis is electrically insulated from the ground terminal and thermally conductively isolated from the housing.

2. The method of claim 1, further comprising forming the at least one of the plurality of AC phase voltage terminals as a manifold having a plurality of phase voltage pads, wherein the phase voltage pads are interdigitated with the electrically grounded wire bonding pads.

3. The method of claim 1, further comprising providing convection air flow that first cools the electronics chassis and then cools the housing.

4. The method of claim 1, further comprising providing a plurality of axially extending heat sink projections that are integral with the chassis.

5. An alternator having a center axis, comprising:
an electrically grounded housing:
a unitary electronics chassis electrically connected to a positive DC output voltage (B+) terminal of the alternator and thermally conductively isolated from the housing;
electronics mounted to the electronics chassis;
a plurality of AC phase voltage terminals; and
intra-connections, formed along a plane substantially orthogonal to the center axis by wire bonding, from each of a ground terminal, the electronics chassis, and the plurality of AC phase voltage terminals, to the electronics;
wherein the ground terminal, the plurality of AC phase voltage terminals, the electronics, and an electronics mounting surface of the positive voltage electronics chassis are disposed in the plane.

6. The alternator of claim 5, further comprising:
a welded/brazed bimetal phase lead electrically connected to one of the AC phase voltage terminals and formed as a manifold having a plurality of wire bonding pads; and
a ground tab formed as a manifold having a plurality of ground pads;
wherein the plurality of wire bonding pads of the phase lead is interposed with the plurality of ground pads of the ground tab.

7. The alternator of claim 6, further comprising thick-film circuitry disposed on an insulating substrate and structured for interconnecting the ground terminal and the positive voltage electronics chassis, with the electronics.

8. The alternator of claim 6, wherein the phase voltage pads are interdigitated with the grounded wire bonding pads.

9. The alternator of claim 8, further comprising plastic/glass overmold structured for preventing electrical conduction between the electronics chassis, the phase voltage manifold, and the ground tab.

10. The alternator of claim 8, further comprising wires bonded between respective ones of the phase voltage wire bonding pads, the ground pads, and the chassis to the electronics, wherein the electronics comprise rectification circuitry and control circuitry configured to control operation of the alternator.

11. An electric machine having a center axis, comprising:
a plurality of phase coils from which AC phase voltage outputs are receivable by a corresponding plurality of AC phase voltage terminals;
a unitary chassis having an electronics mounting surface, having a convection surface with axially-extending heatsink pins, and defining an electrical bus for conducting electricity to a positive DC output voltage (B+) terminal;
a substrate including thick-film circuitry and mounted to the electronics mounting surface;
electronics mounted to the substrate and structured for inputting the AC phase voltage outputs received from the respective phase coils by the AC phase voltage terminals for rectifying the inputted AC phase voltage outputs into a DC voltage defined between the positive DC output voltage (B+) terminal and a ground terminal, and for controlling operation of the rectifying; and
an electrically grounded housing;
wherein the ground terminal, the electronics mounting surface, the plurality of AC phase voltage terminals, and the rectification electronics are disposed in a plane substantially orthogonal to the center axis.

12. The electric machine of claim 11, wherein the electronics include MOSFET devices, and wherein the thick-film circuitry includes a plurality of conductors structured for electrically connecting ones of the AC phase voltage terminals to individual terminals of the MOSFET devices.

13. The electric machine of claim 11, wherein the electronics includes a control circuit and wherein the thick-film circuitry is structured for interconnecting the control circuit with the rectification electronics.

14. The electric machine of claim 11, further comprising a welded/brazed bi-metal phase lead formed as a manifold having a plurality of wire bonding pads.

15. The electric machine of claim 14, further comprising a ground tab formed as a manifold having a plurality of ground pads, and wherein the plurality of wire bonding pads of the phase lead are interposed with the plurality ground pads of the ground tab.

16. The electric machine of claim 15, wherein the wire bonding pads and the ground pads are coplanar with the electronics mounting surface.

17. The electric machine of claim 15, wherein, in the interposed relation, the plurality of wire bonding pads of the phase lead are interdigitated with the plurality ground pads of the ground tab.

18. The electric machine of claim 17, further comprising plastic/glass overmold disposed in space between the interdigitated bonding pads and ground pads for electrically and physically separating the bonding pads from the ground pads.

19. The electric machine of claim 15, wherein the wire bonding pads and the ground pads are coplanar with a surface of the insulating substrate.

20. The electric machine of claim 14, wherein the bi-metal phase lead includes a copper portion structured for connection with a wire from one of the phase coils, and an aluminum portion structured for connection of a bonding wire thereto.

* * * * *